United States Patent [19]

Corrado et al.

[11] Patent Number: 5,251,348
[45] Date of Patent: Oct. 12, 1993

[54] CONTACT CLEANER ROLL CLEANING SYSTEM

[76] Inventors: Frank C. Corrado, 33 Gateway Rd., Rochester, N.Y. 14624; Ronald G. Egan, 945 Joylene Dr.; Gary R. Larsen, 726 Eastwood Cir., both of Webster, N.Y. 14580; Ronald W. Sweet, 2234 E. Lake Rd., Conesus, N.Y. 14435

[21] Appl. No.: 962,854
[22] Filed: Oct. 19, 1992
[51] Int. Cl.⁵ .................... B08B 1/00; B08B 13/00
[52] U.S. Cl. .......................... 15/256.53; 15/3; 15/100; 15/256.52; 101/425; 355/300
[58] Field of Search ............ 15/3, 256.52, 256.53, 15/100; 101/425; 118/261, 652; 355/300

[56] References Cited

U.S. PATENT DOCUMENTS 4,982,469 1/1991 Nishiwaki ........................ 15/3
5,198,253 3/1993 Shimizu et al. .................. 15/256.53

Primary Examiner—Edward L. Roberts

[57] ABSTRACT

A contact cleaner roll cleaning system includes a frame supporting the system relative to a moving web, a contact cleaner roll turret on the frame, and a roll cleaner on the frame. The turret supports two or more rotatable contact cleaner rolls, an active roll in rolling contact with the web, and an idle roll out of contact with the web for cleaning. The idle roll is kept rotating while it is idle and being cleaned. The turret is rotatable to sequentially put the cleaner rolls into and out of contact with the web. The roll cleaner includes an absorbent cleaning material mounted adjacent to the idle roll for placement against it and movement lengthwise along it to wipe it clean. Spindles advance the cleaning material between wipings of the idle roll, and a liquid delivery system keeps the cleaning material wet.

8 Claims, 4 Drawing Sheets 5,251,348

CONTACT CLEANER ROLL CLEANING SYSTEM

FIELD OF THE INVENTION

This invention relates to contact cleaner rolls, and more specifically to an apparatus for sequential cleaning of a plurality of turret-mounted contact cleaner rolls.

BACKGROUND INFORMATION

In certain mechanized processes involving a moving web, such as paper making, printing, or film production, contact cleaner rolls make continuous rolling contact with the moving web to remove loose particles of contamination from the web. As the web moves over the cleaner roll, the loose particulate matter is transferred from the web to the cleaner roll which is somewhat adhesive or tacky. As this transfer process continues, the transferred contaminants accumulate on the surface of the cleaner roll. The cleaner roll itself thus becomes contaminated and must be cleaned periodically to restore its effectivness. This is typically done by shutting down the system or process, retracting the cleaner roll, and washing and drying it manually.

To avoid down time of the system or process, it is desirable that these contact cleaner rolls be cleaned without interrupting the continuous movement of web through the apparatus. This invention provides a mechanized system for such cleaning of these rolls.

SUMMARY OF THE INVENTION

The present invention is a contact cleaner roll cleaning system, including a frame supporting the system relative to a moving web, a contact cleaner roll turret on the frame, and a roll cleaner on the frame.

The turret supports two or more rotatable contact cleaner rolls, an active roll in rolling contact with the web, and an idle roll out of contact with the web for cleaning. A drive motor maintains the rotational speed of the idle roll while it is idle and being cleaned. The turret is rotatable to sequentially put the cleaner rolls into and out of contact with the web.

The roll cleaner includes an absorbent cleaning material mounted adjacent to the idle roll for placement against it and movement lengthwise along it to wipe it clean. Supply and take-up spindles advance the cleaning material between wipings of the idle roll, and a liquid delivery system keeps the cleaning material wet.

DRAWING

DESCRIPTION

Figure 1:
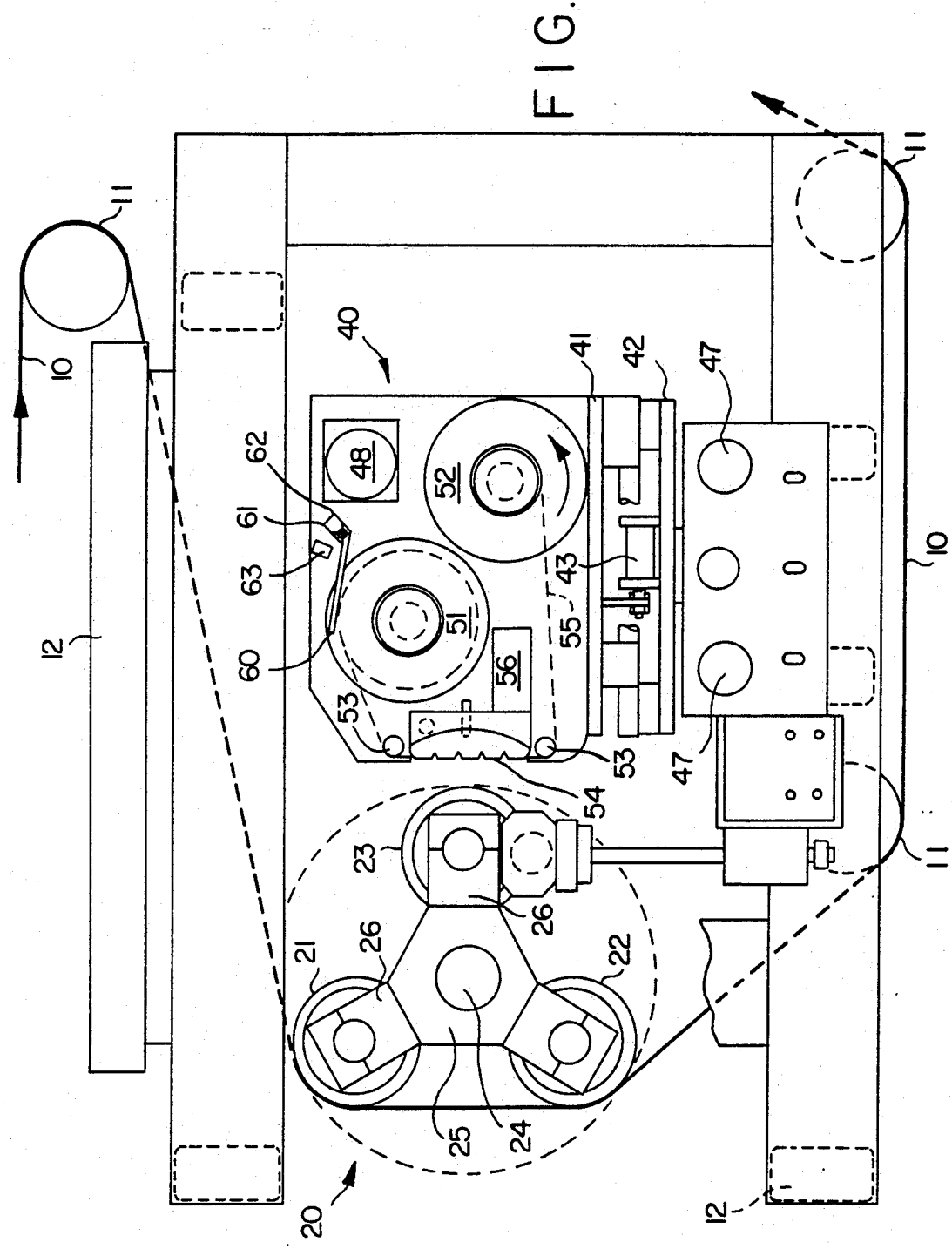
FIG. 1 is an end elevation view of our contact cleaner roll system, with obscuring end structure removed.

FIG. 1 shows our contact cleaner roll system in a web processing apparatus. The web processing apparatus is indicated by a web 10 moving from left to right in a serpentine path over a series of rollers 11 on a frame 12. A contact cleaner roll turret 20, including contact cleaner rolls 21, 22, 23, is mounted on the frame 12 in the path of the web 10. The cleaner rolls 21, 22, 23 are steel rolls, coated with a polymer for a tacky surface. The tacky surfaces of the cleaner rolls, in rolling contact with the moving web 10, remove particles of contamination from the web 10 as it rolls over them. The contact cleaner rolls in turn become contaminated and must be cleaned periodically to restore their effectiveness. A roll cleaner 40 is positioned adjacent to the contact cleaner roll turret 20 for movement into and out of engagement with it.

Figure 2:
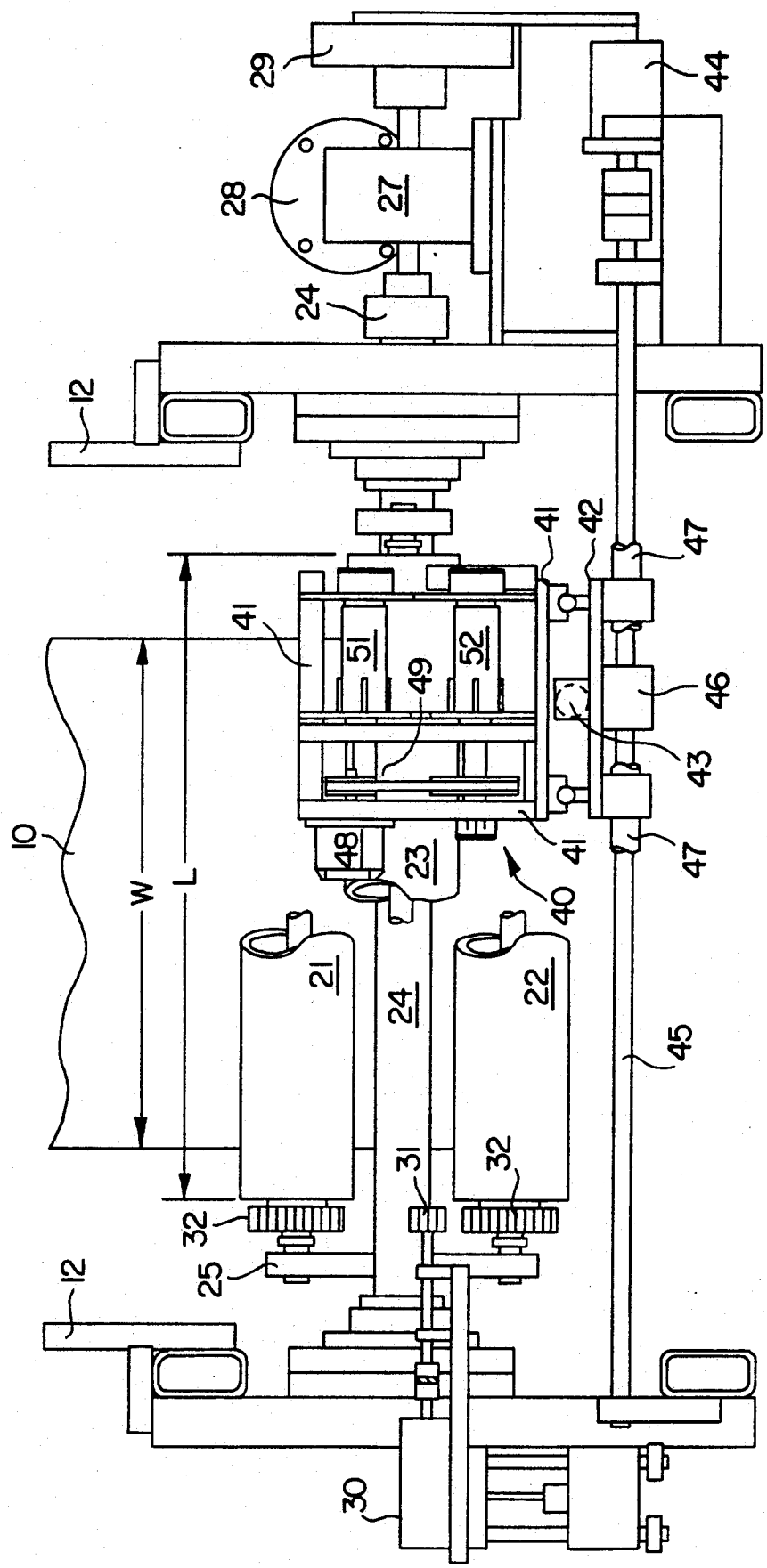
FIG. 2 is a front elevation view from the right of FIG. 1, with obscuring front structure removed.
Figure 3:
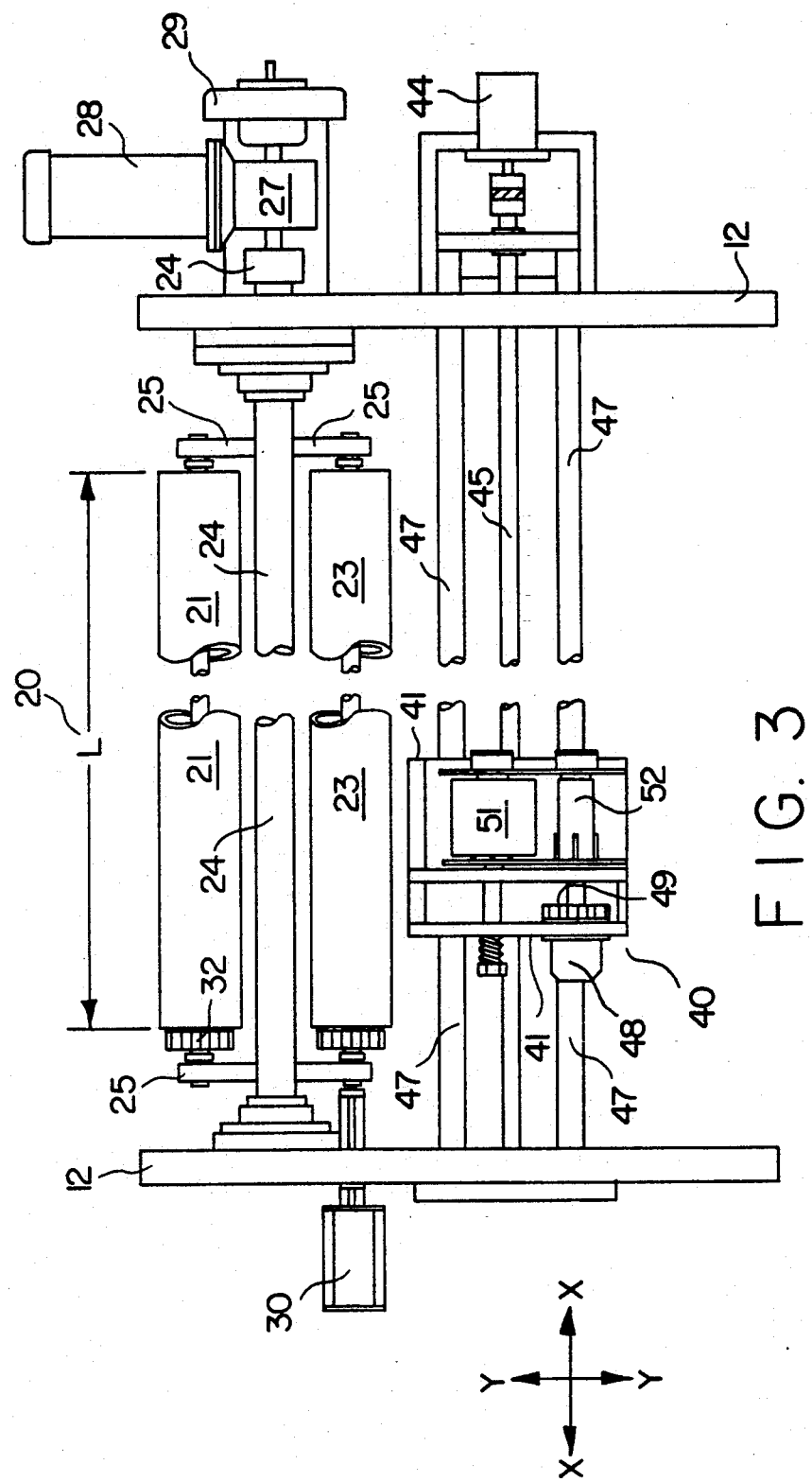
FIG. 3 is a top view of FIG. 2, with obscuring top structure removed.

FIGS. 2 and 3 are front and top views, further showing the relationship of the frame 12, the roll turret 20, and the contact cleaner rolls 21, 22, 23. The cleaner rolls 21, 22, 23 are of length L to span the full width W of the moving web 10 (L being greater than W).

In FIGS. 1-3, the cleaner roll turret 20 includes a rotatable turret shaft 24 extending from end to end of the frame 12, with an end plate 25 fixed to it at each end. Each end plate includes three radial arms 26, each supporting one end of a rotatable cleaner roll. The turret shaft 24 is connected through a suitable gear train 27 to a motor 28 and to a locking brake 29. The turret shaft 24 is positioned with two of its cleaner rolls 21, 22 active, in rolling contact with the moving web 10 to clean the web. The third cleaner roll 23 is out of contact with the web 10, idle and out of service for its own cleaning. The motor 28 periodically rotates the turret 20 by the appropriate amount, 120° in this example, to take one cleaner roll out of service and to put another cleaner roll into service.

In FIGS. 2 and 3, a speed match drive motor 30 with a drive pinion 31 is mounted on the frame 12. Each of the cleaner rolls 21, 22, 23 has a drive gear 32 attached to it. The drive pinion 31 engages the drive gear 32 of the out-of-service cleaner roll (roll 23 in FIGS. 2 and 3). The drive motor 30 drives the out-of service roll 23 and maintains its proper running speed to bring it back on line in rolling contact with the moving web 10. It is important to match the speed of the roll 23 with the speed of the web 10. The roll is tacky and adhesive, and if the speeds did not match, it would grab, disrupt, and even damage the moving web 10. The automatic roll cleaner 40 includes a subframe 41 mounted on a base plate 42 and movable relative to it in the Y direction (FIG. 3) toward and away from the idle cleaner roll 23. The base plate 42 is in turn mounted on the main frame 12 and is movable relative to it in the X direction, lengthwise along the idle cleaner roll 23. The roll cleaner 40 is thus movable relative to the main frame 12 in both X and Y directions in the horizontal plane. An air motor or cylinder 43 mounted on the base plate 42 moves the subframe 41 back and forth in the Y direction. A reversible stepper motor 44 mounted on the frame 12 moves the base plate 42, back and forth in the X direction, on slide rails 47 by a linear actuator 45, 46, analogous to a screw and nut. The portion of the main frame 12 supporting the roll cleaner 40 extends beyond the cleaner rolls 21, 22, 23 to provide a "home" position for the roll cleaner 40 when it is not in use or requires a cleaning cloth change.

Referring particularly to FIG. 1, the cleaning head of the roll cleaner 40 includes a supply spindle 51 and a take-up spindle 52 for cleaning cloth 55, and a pair of guide bars 53 defining the path of the cleaning cloth 55 from the supply spindle 51 to the take-up spindle 52. A sponge pad 54 (see also FIG. 4) between the guide bars 53 abuts against the cleaning cloth 55. The sponge pad 54 is mounted on a concave backing plate 56 which includes a water inlet port 57 and internal ports leading from the inlet port 57 to the back of the sponge pad 54.

A moisture sensor 58 is mounted on the backing plate 56, and in contact with the sponge pad 54 to detect moisture in the sponge pad. The moisture sensor 58 disables the system if the moisture level of the sponge pad is inadequate.

The supply spindle 51 is initially full, and the take-up spindle 52 is initially empty of cleaning cloth 55. The take-up spindle is driven by a motor 48 and belt 49 to advance the cleaning cloth intermittently from the supply spindle 51 to the take-up spindle 52. The take-up spindle 52 pulls cloth from the supply spindle 51, over the guide bars 53, in the direction shown in FIG. 1.

A no-cloth detector includes pivot arms 60 and 61 on a pivot axis 62. The first pivot arm 60 rests on the cloth 55 in the supply spindle 51. The second pivot arm 61 is movable from an open position, as shown, to a closed position in contact with a sensor 63 to signal a no-cloth condition and shut down the entire system.

Figure 4:
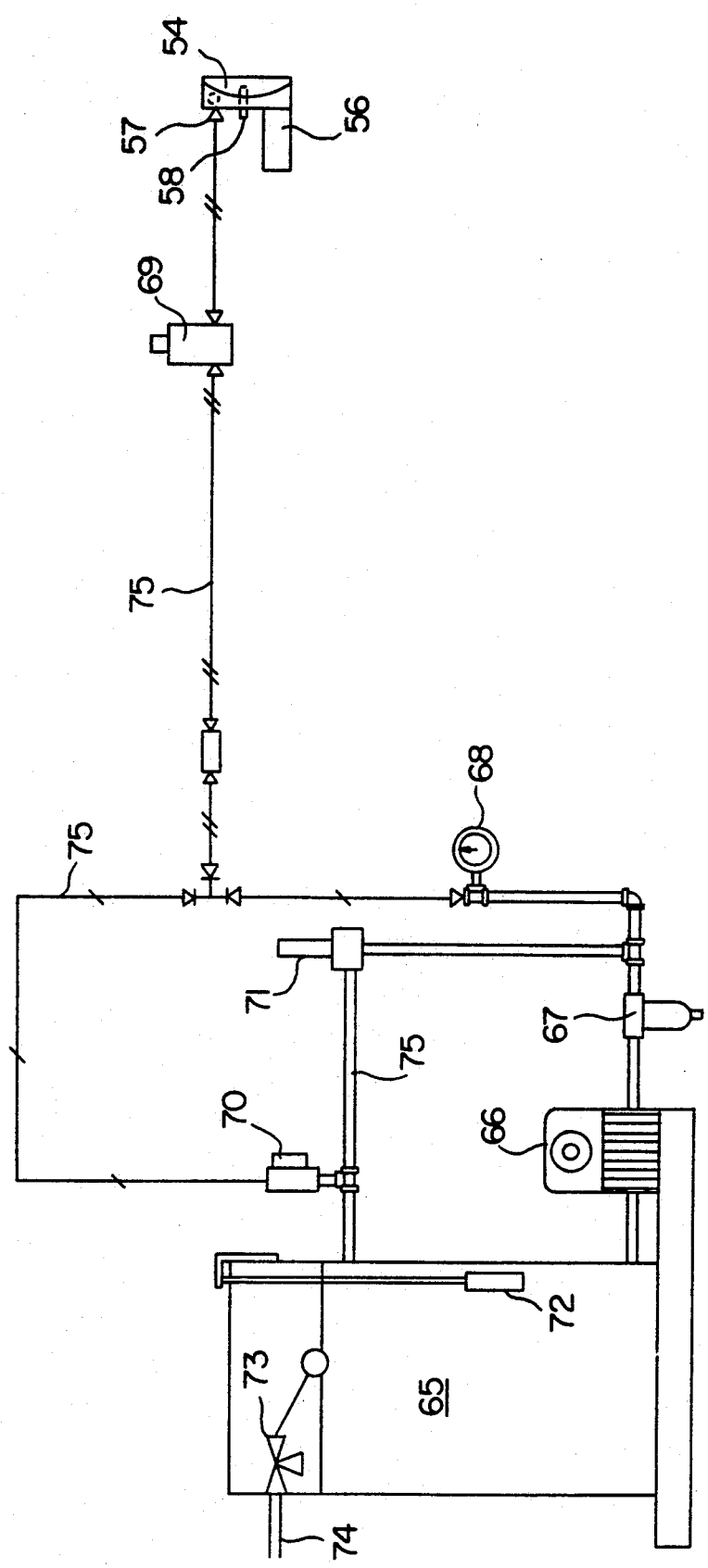
FIG. 4 is a schematic diagram of the fluid system of the apparatus.

In FIG. 4, the essential elements of the fluid system include: water supply reservoir 65, metering pump 66, filter 67, pressure gage 68, solenoid operated stop valve 69, pressure regulator 70, relief valve 71, low level sensor 72, float valve 73. A source 74 of demineralized water leads into the tank 65 through the float valve 73. The water lines leading from the tank 65 to and from all the other elements are indicated at 75. The pump 66 supplies water to the solenoid stop valve 69, and through valve 69 to the inlet port 57 of the backing plate 56 and to the sponge pad 54. The pressure regulator 70 maintains 50 psig pressure in the system. The float valve 73 maintains the desired water level in the tank 65. In the event of some failure in the supply of water, the low level sensor 72 shuts the entire system down when it senses a certain low water level.

The foregoing description of a preferred embodiment of this invention, including any dimensions, angles, or proportions, is intended as illustrative. The concept and scope of the invention are limited only by the following claims and equivalents thereof.

What is claimed is:

1. A contact cleaner roll cleaning system, including:
   a frame to support the system relative to a moving web; a contact cleaner roll turret on said frame; and a roll cleaner on said frame;
   said turret including a plurality of rotatable contact cleaner rolls supported thereon; an active one of said rolls disposed for rolling contact with said web, and an idle one of said rolls disposed out of contact with said web and in operative engagement with drive means to maintain the rotational speed of said idle roll; said turret being rotatable to sequentially place said rolls into and out of contact with said web;
   said roll cleaner mounted adjacent to said idle roll for movement into and out of engagement therewith and lengthwise therealong; said roll cleaner including an absorbent cleaning material for placement against said idle roll.

2. A contact cleaner roll cleaning system as defined in claim 1, further including means to advance said cleaning material between engagements thereof with said idle roll.

3. A contact cleaner roll cleaning system as defined in claim 1, further including means to maintain moisture in said cleaning material.

4. A contact cleaner roll cleaning system, including:
   a frame to support a the system relative to a moving web; a contact cleaner roll turret on said frame; and a roll cleaner on said frame;
   said turret including a turret shaft, a plurality of rotatable contact cleaner rolls supported by said turret shaft, an active one of said rolls disposed for rolling contact with said web, and an idle one of said rolls disposed out of contact with said web and in operative engagement with drive means to maintain the rotational speed of said idle roll; said turret shaft being rotatable to sequentially place said rolls into and out of contact with said web;
   said roll cleaner mounted adjacent to said idle roll for movement into and out of engagement therewith and lengthwise therealong; said roll cleaner including supply and take-up spindles and means to advance cleaning cloth from said supply spindle to said take-up spindle, a water absorbent pad disposed in the path of said cleaning cloth between said supply spindle and said take-up spindle, and a water system to maintain a level of moisture in said pad above a predetermined level.

5. A contact cleaner roll cleaning system as defined in claim 4, further including means responsive to the amount of cloth on said supply spindle below a predetermined amount to render said system inoperable.

6. A contact cleaner roll cleaning system as defined in claim 4, further including means responsive to moisture in said pad below said predetermined level to render said system inoperable.

7. A contact cleaner roll cleaning system as defined in claim 4, said water system including:
   a water reservoir, a water pump, a solenoid valve to selectively direct water from said pump to said pad, and a water level sensor responsive to water level in said reservoir below a predetermined level to render said system inoperable.

8. A contact cleaner roll cleaning system, including:
   a frame to support the system relative to a moving web; a contact cleaner roll turret on said frame; and a roll cleaner on said frame;
   said turret including a rotatable turret shaft with an end plate fixed at each end thereof, a plurality of contact cleaner rolls rotatably mounted between said end plates parallel to said turret shaft, an active one of said rolls disposed for rolling contact with said web, an idle one of said rolls disposed out of contact with said web, and means to maintain the speed of said idle roll for return to rolling contact with said web;
   said roll cleaner mounted adjacent to said idle roll for movement into and out of engagement therewith and lengthwise therealong; said roll cleaner including supply and take-up spindles and means to advance cleaning cloth from said supply spindle to said take-up spindle, a water absorbent pad disposed in the path of said cleaning cloth between said supply spindle and said take-up spindle, means responsive to the amount of cloth on said supply spindle below a predetermined amount to render said system inoperable, means responsive to moisture in said pad below a predetermined level to render said system inoperable, and a water system to maintain the level of moisture in said pad above said predetermined level.

* * * * *